United States Patent
Kim

(10) Patent No.: US 7,206,358 B2
(45) Date of Patent: Apr. 17, 2007

(54) ERROR RECOVERY APPARATUS OF DIGITAL BROADCASTING RECEIVER TO COMPENSATE A PHASE-ERROR GENERATED BY A BROADCASTING SIGNAL TRANSMITTED THROUGH A MULTI-PATH CHANNEL

(75) Inventor: Joon-Soo Kim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 714 days.

(21) Appl. No.: 10/279,876

(22) Filed: Oct. 25, 2002

(65) Prior Publication Data
US 2003/0081704 A1    May 1, 2003

(30) Foreign Application Priority Data
Nov. 1, 2001   (KR) ............................... 2001-67850

(51) Int. Cl.
*H04L 27/00*    (2006.01)
*H04L 7/00*     (2006.01)
*H03H 7/40*     (2006.01)

(52) U.S. Cl. ...................... 375/316; 375/326; 375/355; 375/229

(58) Field of Classification Search ................ 375/260, 375/316, 355, 326, 229–233; 329/307, 308; 327/298
See application file for complete search history.

(56) References Cited

U.S. PATENT DOCUMENTS

| 5,264,937 | A | * | 11/1993 | Christopher | ................. 348/725 |
| 5,430,770 | A | * | 7/1995 | Abbey | ......................... 375/349 |
| 5,661,528 | A | * | 8/1997 | Han | ............................ 348/607 |
| 5,818,371 | A | * | 10/1998 | Lu et al. | ....................... 341/122 |
| 6,115,431 | A | * | 9/2000 | Lee | .............................. 375/324 |
| 6,298,100 | B1 | * | 10/2001 | Bouillet | ....................... 375/326 |

(Continued)

FOREIGN PATENT DOCUMENTS

CN    1295402    5/2001

(Continued)

OTHER PUBLICATIONS

Office Action issued Dec. 17, 2004 from Chinese Patent Office in corresponding Chinese Patent Application No. 02151566.2, filed Nov. 1, 2002.

(Continued)

*Primary Examiner*—Tesfaldet Bocure
(74) *Attorney, Agent, or Firm*—Staas & Halsey LLP

(57) ABSTRACT

An error recovery apparatus and method of a digital broadcasting receiver includes an analog-to-digital converting (ADC) unit, a splitter, a sampling distortion compensation unit, a phase error compensation unit, and an equalizer. The ADC unit converts a broadcasting signal of an analog format into a digital format through sampling. The splitter shifts the broadcasting signal of the digital format to a baseband, and splits the broadcasting signal to an in-phase channel signal and a quadrature channel signal. The sampling distortion compensation unit compensates an error generated in the broadcasting signal due to the sampling of the ADC unit. The phase error compensation unit compensates a phase error caused by interference of the broadcasting signal when the broadcasting signal is transmitted through a multi-path channel. The equalizer removes the broadcasting signal which is not transmitted through a main path of the multi-path channel.

14 Claims, 9 Drawing Sheets

U.S. PATENT DOCUMENTS

| | | | |
|---|---|---|---|
| 6,301,316 B1 * | 10/2001 | Uchida et al. | 375/347 |
| 6,731,706 B1 * | 5/2004 | Acharya et al. | 375/350 |
| 6,928,111 B2 * | 8/2005 | Kim | 375/231 |
| 2002/0037058 A1 * | 3/2002 | Birru | 375/340 |

FOREIGN PATENT DOCUMENTS

| | | |
|---|---|---|
| JP | 09-205565 | 8/1997 |
| JP | 9-511118 | 11/1997 |
| JP | 2001-094618 | 4/2001 |
| JP | 2001-505727 | 4/2001 |

OTHER PUBLICATIONS

Japanese Office Action issued on Mar. 7, 2006, in Japanese Patent Application No. 2001-316688 which corresponds to U.S. Appl. No. 10/279,876.

* cited by examiner

ERROR RECOVERY APPARATUS OF DIGITAL BROADCASTING RECEIVER TO COMPENSATE A PHASE-ERROR GENERATED BY A BROADCASTING SIGNAL TRANSMITTED THROUGH A MULTI-PATH CHANNEL

CROSS-REFERENCE TO RELATED APPLICATIONS

This application claims the benefit of Korean Application No. 2001-67850, filed Nov. 1, 2001, in the Korean Intellectual Property Office, the disclosure of which is incorporated herein by reference.

BACKGROUND OF THE INVENTION

1. Field of the Invention

The present invention relates to an error recovery apparatus of a digital broadcasting receiver, and more particularly, to an error recovery apparatus of a digital broadcasting receiver to compensate a sampling timing offset and a carrier frequency offset of a corresponding broadcasting signal when a digital broadcasting signal is restored in which a vestigial sideband modulation method is applied.

2. Description of the Related Art

To transmit a broadcasting signal to realize digital broadcasting, a VSB (vestigial sideband) modulation method and a COFDM (coded orthogonal frequency division multiplexing) modulation method are provided. The VSB modulation method transmits the broadcasting signal to a single carrier. The COFDM modulation method transmits the broadcasting signal through a multi-transmission-route by multiple-dividing the broadcasting signal. At present, the VSB modulation method is used in Korea and the USA, and the COFDM modulation method is a European style digital broadcasting transmission method.

FIG. 1 is a block diagram showing a conventional error recovery apparatus of a digital broadcasting receiver receiving the broadcasting signal transmitted using the VSB (vestigial sideband) modulation method. The error recovery apparatus has an ADC (analog to digital converter) 11, an I/Q (in-phase/quadrature) splitter 13, an STR (symbol timing recovery) 17, an interpolator 15, a DFPLL (digital frequency phase locked loop) 21, an MF (matched filter) 23, and an equalizer 25.

The ADC 11 converts the transmitted broadcasting signal having an analog format into a digital format by digitally sampling the transmitted broadcasting signal. The I/Q splitter 13 shifts the broadcasting signal of the digital format to a baseband, and splits the broadcasting signal into an in-phase channel signal and a quadrature channel signal.

The SRT 17 detects timing error with respect to a symbol corresponding to the broadcasting signal generated when the broadcasting signal is being sampled at the ADC 11. The interpolator 15 restores a timing of the corresponding symbol based on a timing error value detected at the STR 17. Moreover, the interpolator 15 calculates clock information corresponding to the restored timing. The DFPLL 21 corrects a frequency offset with respect to the broadcasting signal, in other words, the DFPLL 21 corrects a phase of the broadcasting signal and distortion of a carrier signal through a pilot signal when transmitting the broadcasting signal and the clock information calculated at the interpolator 15. At this time, the frequency offset and broadcasting signal that compensate the distortion of the carrier signal are multiplied with a broadcasting signal output from the interpolator 15 through a multiplier 19 and then output to the MF 23.

The MF 23 filters the broadcasting signal output from the multiplier 19 in order to maximize a ratio of noise to signal in relation to the broadcasting signal output. The equalizer 25 corrects the error generated in the transmission of the broadcasting signal output from a transmission terminal.

However, the broadcasting signal transmitted using the VSB modulation method from the transmission terminal is transmitted through a broadcasting channel formed by air, where a transmission channel of a sub-path can be formed besides a main-path due to reflection by obstacles. When the broadcasting signal transmitted through the multi-path channel is restored through the conventional error recovery apparatus of the digital broadcasting signal receiver, an offset is generated in relation to the broadcasting signal transmitted though the sub-path compared with the broadcasting signal transmitted through the main-path. The broadcasting signal having the above phase offset is input into the equalizer 25, and the broadcasting signal having the phase offset becomes a reason of deteriorating an operation efficiency of the equalizer 25 and the entire apparatus. Further, the phase offset of the broadcasting signal transmitted through the sub-path has different values based on the transmission path of the broadcasting signal.

When the multi-path channel is a single ghost environment having an amplitude 'a' and a phase 'θ', a response (h(t)) of the channel can be expressed as the following mathematical expression 1:

$$h(t) = \delta(t) + \alpha e^{j\theta} \cdot \delta(t-\tau)$$

Therefore, the response value (h(t)) has a different value when a receiving time of the broadcasting signal is different based on the channel in relation to the multi-path channel.

A pilot tone (P(t)) showing a level of a pilot signal of the broadcasting signal transmitted through the multi-path channel has a phase offset expressed in the following mathematical expression 2:

$$P(t) = \tan^{-1}\left[\frac{-\alpha \cdot \sin(2\pi f \tau + \theta)}{1 + \alpha \cdot \cos(2\pi f \tau + \theta)}\right]$$

where, 'f' is a difference of a center frequency ($f_m$) for the broadcasting signal and a frequency ($f_p$) of the pilot tone.

According to the mathematical expression 2, a maximum phase offset generated in relation to the change of the phase θ is given as $\sin^{-1}\alpha$. Yet, the interpolator 15 performs the timing recovery so that the phase of the broadcasting signal transmitted through the main path and that of the pilot tone transmitted through the sub path can be identical. Therefore, the interpolator 15 performs the timing recovery to reduce the offset, when the offset is generated in relation to the broadcasting signal. At this time, the carrier timing recovery falls to a half of a phase value of the broadcasting signal transmitted through the main path and the broadcasting signal transmitted through the sub path.

Therefore, in the conventional error recovery apparatus of the digital broadcasting receiver, the broadcasting signal is applied to the equalizer 25 without full recovery of the phase offset of the broadcasting signal according to the multi-path channel, which deteriorates an efficiency of the equalizer 25.

Therefore, in the conventional error recovery apparatus of the digital broadcasting receiver, when the broadcasting signal intervenes after being transmitted through more than one channel besides the main path that is the multi-path channel, the phase error is bound to be generated, even through the carrier and the timing recovery in relation to the broadcasting signal transmitted through the main path is done. As the broadcasting signal including the generated phase error is applied, the efficiency of the equalizer 25 is deteriorated.

SUMMARY OF THE INVENTION

Various objects and advantages of the invention will be set forth in part in the description that follows and, in part, will be obvious from the description, or may be learned by practice of the invention.

Accordingly, it is the object of the present invention to provide an error recovery apparatus of a digital broadcasting receiver to improve a performance of an equalizer and a system by recovering a phase offset occurring due to interference of respective broadcasting signals, during the recovery of the broadcasting signal transmitted through a multi-path channel, and an error compensating method using the error recovery apparatus.

To solve the above-described problems, it is an object of the present invention to provide an error recovery apparatus of a digital broadcasting receiver, including: an analog-to-digital converting (ADC) unit to convert a broadcasting signal of an analog format into a digital format through sampling; a splitter to shift the broadcasting signal of the digital format to a baseband, and to split the broadcasting signal to an in-phase channel signal and a quadrature channel signal; a sampling distortion compensation unit to compensate an error generated in the broadcasting signal due to the sampling of the ADC unit; a phase error compensation unit to compensate a phase error caused by interference of the broadcasting signal when the broadcasting signal is transmitted through a multi-path channel; and an equalizer to remove the broadcasting signal which is not transmitted through a main path of the multi-path channel.

The sampling distortion compensation unit includes a timing error compensation unit to compensate a timing error generated in the broadcasting signal due to the sampling of the broadcasting signal; and a frequency phase synchronization unit to compensate a carrier distortion and the phase error generated in the broadcasting signal due to the sampling of the broadcasting signal. The sampling distortion compensation unit further includes a timing error detection unit to detect a timing error value generated at the ADC unit, and a timing error compensation unit to compensate a timing error of the broadcasting signal based on the timing error value detected at the timing error detection unit.

Further provided is a matched filter disposed between the sampling distortion compensation unit and the phase error compensation unit, to waveform the broadcasting signal that has the compensated carrier distortion and the phase error. And further provided is an FEC disposed after the equalizer to recover data error of the broadcasting signal generated on a transmission path of the broadcasting signal.

The phase error compensation unit includes a phase error calculation unit to calculate a phase error value caused by the interference of the broadcasting signal transmitted through the multi-path channel from a segment synchronization signal, which is a synchronization signal for each data of the broadcasting signal; and a division operation unit to compensate the phase error by complex multiplying the calculated phase error value of the broadcasting signal by the phase error of the broadcasting signal due to the multi-path channel. The broadcasting signal has 832 symbols per data and the segment synchronization signal is generated for every 832 symbols, and the segment synchronization signal includes four symbols. The phase error calculation unit calculates the phase error of the broadcasting signal based on a difference of two median symbols of the four symbols of the segment synchronization signal.

The phase error calculation unit includes a segment synchronization detection unit to detect the segment synchronization signal having the four symbols; a phase error detection unit to calculate a difference value of two middle symbols among the four symbols; a loop filter to calculate a phase angle corresponding to the phase error through a linear feature of the broadcasting signal corresponding to the difference value of the two middle symbols; and a phase error value calculation unit to calculate the phase error value by calculating a trigonometrical function value corresponding to the phase angle.

The phase error detection unit includes a first segment synchronization calculation unit to calculate a first synchronization value that is a segment synchronization value of a second symbol among the four symbols; a second segment synchronization calculation unit to calculate a second synchronization value that is the segment synchronization value of a third symbol among the four symbols; a subtraction unit to calculate a difference of a phase of the second symbol and a phase of the third symbol; and an output unit to output the difference to the loop filter.

To solve the above-described problems, it is an object of the present invention to provide an error compensating method of a digital broadcasting receiver including: converting the broadcasting signal of an analog format into digital format by sampling the broadcasting signal; shifting the broadcasting signal of the digital format to a baseband and splitting the broadcasting signal to an in-phase channel signal or a quadrature channel signal; compensating an error generated in the broadcasting signal due to the sampling of the broadcast signal; compensating a phase error caused by mutual interference of the transmitted broadcasting signal when the broadcasting signal is transmitted through a multi-path channel; and removing the broadcasting signal transmitted through a transmission path except a main path through which the broadcasting signal is transmitted.

The compensation of the error generated in the broadcasting signal includes: compensating a timing error generated in the broadcasting signal when the sampling is performed, and compensating a carrier distortion and the phase error generated in the broadcasting signal when the sampling is performed.

The compensation of the error generated in the broadcasting signal includes: detecting a timing error value of the broadcasting signal generated when the sampling is performed, where the timing error of the broadcasting signal is compensated based on the detected timing error value. The broadcasting signal has 832 symbols per data, and the segment synchronization signal is generated every 832 symbols, and the segment synchronization signal includes four symbols. The phase error value is calculated through a difference value in relation to two symbols among the segment synchronization signals in the compensation of the phase error. The compensation of the phase error includes: detecting the segment synchronization signal of the four symbols from the broadcasting signal, calculating a difference value of a synchronization value of two middle symbols among the four symbols, calculating a phase angle corresponding to the phase error through a linear feature of the broadcasting signal corresponding to the difference value, and calculating the phase error value by calculating a trigonometrical function value corresponding to the phase angle.

The calculation of the difference value of the synchronization value of the two middle symbols includes: calculating a first synchronization value that is a segment synchronization value of a second symbol among the four symbols, calculating a second synchronization value that is the segment synchronization value of third symbol among the four symbols, and calculating a difference of a phase of the second symbol and a phase of the third symbol by subtracting the first synchronization value from the second synchronization value and outputting a signal indicative thereof.

According to the present invention, the phase offset caused by the broadcasting signal transmitted through the multi-path channel is removed after recovering a carrier/timing signal in relation to the broadcasting signal, thus a load operation of the equalizer is reduced and accordingly, an efficiency of the equalizer is improved. Moreover, an efficiency of the digital broadcasting receiver is also improved.

To solve the above-described problems, it is an object of the present invention to provide an error recovery apparatus of a digital broadcasting receiver to compensate a phase error generated when recovering a broadcasting signal transmitted through a multi-path channel, including: an analog-to-digital converter digitally sampling the broadcasting signal and converting broadcasting signal of an analog format into a digital format; a sampling distortion compensation unit compensating an error generated in the broadcasting signal due to the digitally sampling of the broadcasting signal; a digital frequency phase locked loop recovering the phase of the broadcasting signal and compensating a distortion of a carrier signal of the broadcasting signal by tracing position information of a pilot signal that is inserted at a time the broadcasting signal is transmitted; and a phase error compensation unit removing a phase offset caused by an interference in the broadcasting signal transmitted through the multi-path channel after recovering and compensating the distortion of the carrier signal in relation to the broadcasting signal.

To solve the above-described problems, it is an object of the present invention to provide an error recovery apparatus of a digital broadcasting receiver to compensate a phase error generated when recovering a broadcasting signal transmitted through a multi-path channel, including: removing a phase offset caused by an interference of the broadcasting signal transmitted through the multi-path channel after recovering a carrier/timing in relation to the broadcasting signal; and compensating a phase error in relation to the broadcasting signal before a display of the broadcasting signal to reproduce a image clearer than displaying the image in relation to the broadcasting signal.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above-mentioned objects and the feature of the present invention will be more apparent by describing the preferred embodiment of the present invention by referring to the appended drawings, in which.

DETAILED DESCRIPTION OF THE PREFERRED EMBODIMENTS

Figure 1:
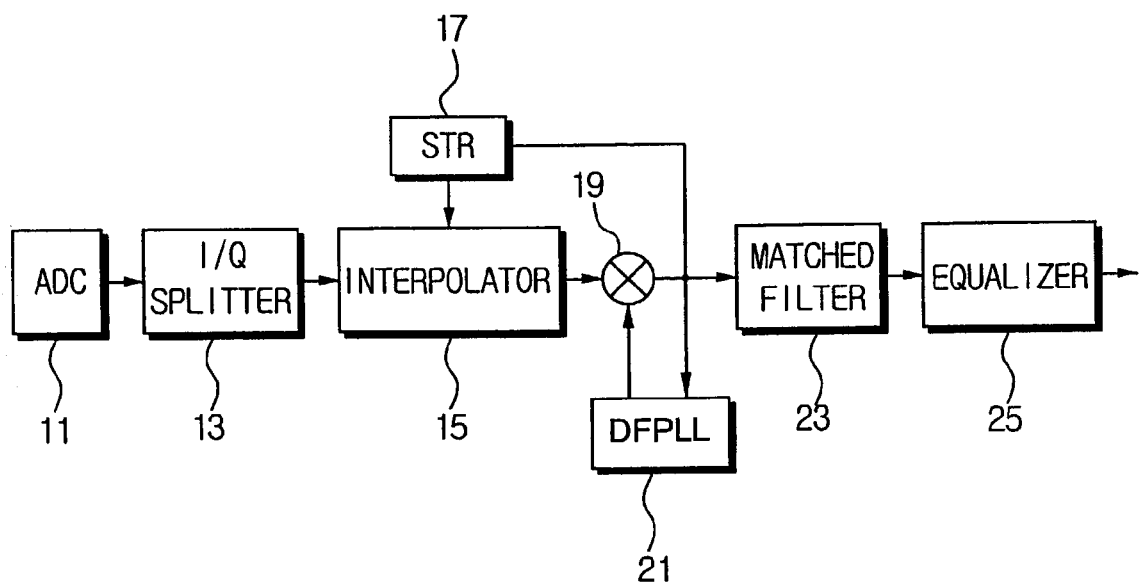
FIG. 1 is a block diagram showing a conventional error recovery apparatus of a digital broadcasting receiver.

Hereinafter, embodiments of the present invention will be described in detail with reference to the attached drawings, wherein the like reference numerals refer to the like elements throughout. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 2:
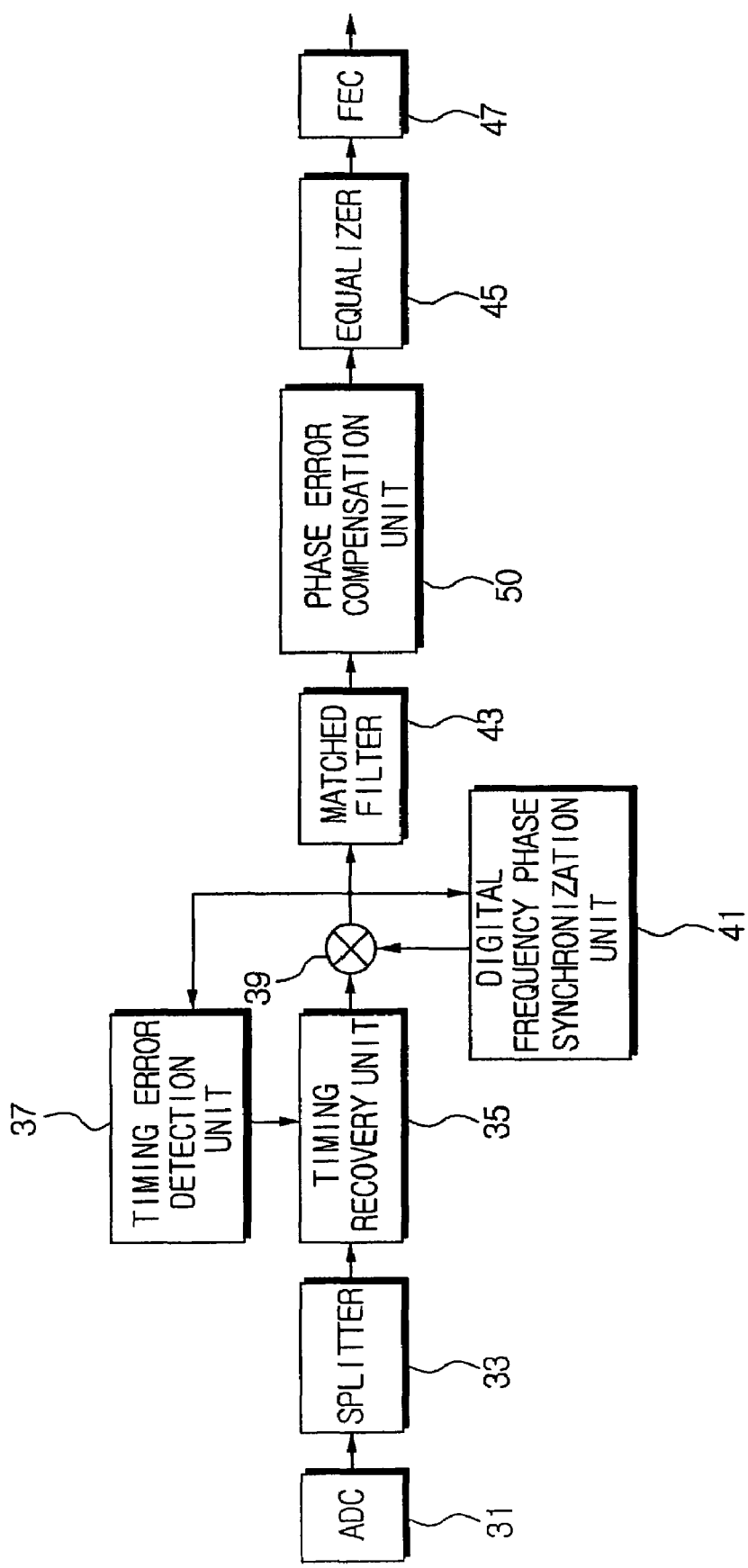
FIG. 2 is a block diagram showing an embodiment, according to the present invention, of an error recovery apparatus of a digital broadcasting receiver.

FIG. 2 is a block diagram showing an error recovery apparatus of a digital broadcasting receiver to compensate a phase error generated when recovering a broadcasting signal transmitted through a multi-path channel, according to an embodiment of the present invention. As shown in FIG. 2, the error recovery apparatus of the digital broadcasting receiver has an ADC (analog to digital converter) 31, a splitter 33, a timing error detection unit 37, a timing recovery unit 35, a DFPLL (digital frequency phase locked loop) 41, an MF (matched filter) 43, a phase error compensation unit 50, an equalizer 45, and an FEC (forward error correction) 47.

The ADC 31 converts the transmitted broadcasting signal of an analog format into a digital format after digitally sampling the broadcasting signal. The splitter 33 shifts the sampled and converted broadcasting signal in relation to the transmitted broadcasting signal to a vicinity of a baseband of a frequency band applicable to a QAM (quadrature amplitude modulation) method. At this time, the quadrature amplitude modulated broadcasting signal is shifted to the baseband, and a vestigial sideband modulated broadcasting signal is placed in a passband. Moreover, the splitter 33 splits the broadcasting signal into an I (in-phase) channel signal and a Q (quadrature) channel. For instance, the splitter 33 uses an I/Q (in-phase/quadrature) splitter.

The timing error detection unit 37 detects a timing error value in relation to a symbol corresponding to the broadcasting signal generated when sampling the broadcasting signal at ADC 31. The timing recovery unit 35 recovers the timing error of the corresponding symbol based on the timing error value detected at the timing error detection unit 37. In addition, the timing recovery unit 35 transmits clock information of the recovered timing error to the DFPLL 41.

The DFPLL 41 recovers the phase of the broadcasting signal, which is a frequency offset in relation to the broadcasting signal through the clock information output from the timing recovery unit 35. Additionally, the DFPLL 41 compensates a distortion of a carrier signal including the broadcasting signal by tracing position information of the pilot signal that is inserted by a transmitting end (not shown) at the time the broadcasting signal is transmitted. At this time, when recovering the broadcasting signal through a multiplier 39, the broadcasting signal that has recovered the distortion of the frequency offset and the carrier signal compensates the phase error generated.

After the recovery of carrier distortion and timing error by the timing recovery unit 35 and the DFPLL 41, the MF 43 waveforms the broadcasting signal so that a signal per noise (S/N) rate of the broadcasting signal can be maximized. For instance, an SRC (square-root raised cosine) filter is used as the MF 43, and the filter is set up to have a roll-off of 0.1152.

The phase error compensation unit 50 compensates a phase offset in relation to each symbol generated when recovering the signals according to the multi-path channel of the broadcasting signal output from the MF 43. The equalizer 45 removes broadcasting signals transmitted through the multi-path channel except a main path. The FEC 47 detects and compensates data error generated during the transmission after being output from a transmission terminal in relation to the broadcasting signal output from the equalizer 45.

Therefore, the phase error compensation unit 50 reduces an operation load of the equalizer 45 by compensating the phase offset of the broadcasting signal due to the interference of the broadcasting signal transmitted by the multi-path channel after the timing error and the carrier distortion in relation to the broadcasting signal is operated by the timing recovery unit 35 and the DFPLL 41. Accordingly, a capability of the equalizer 45 and a display operation in relation to the broadcasting signal of the digital broadcasting receiver is improved.

Figure 3:
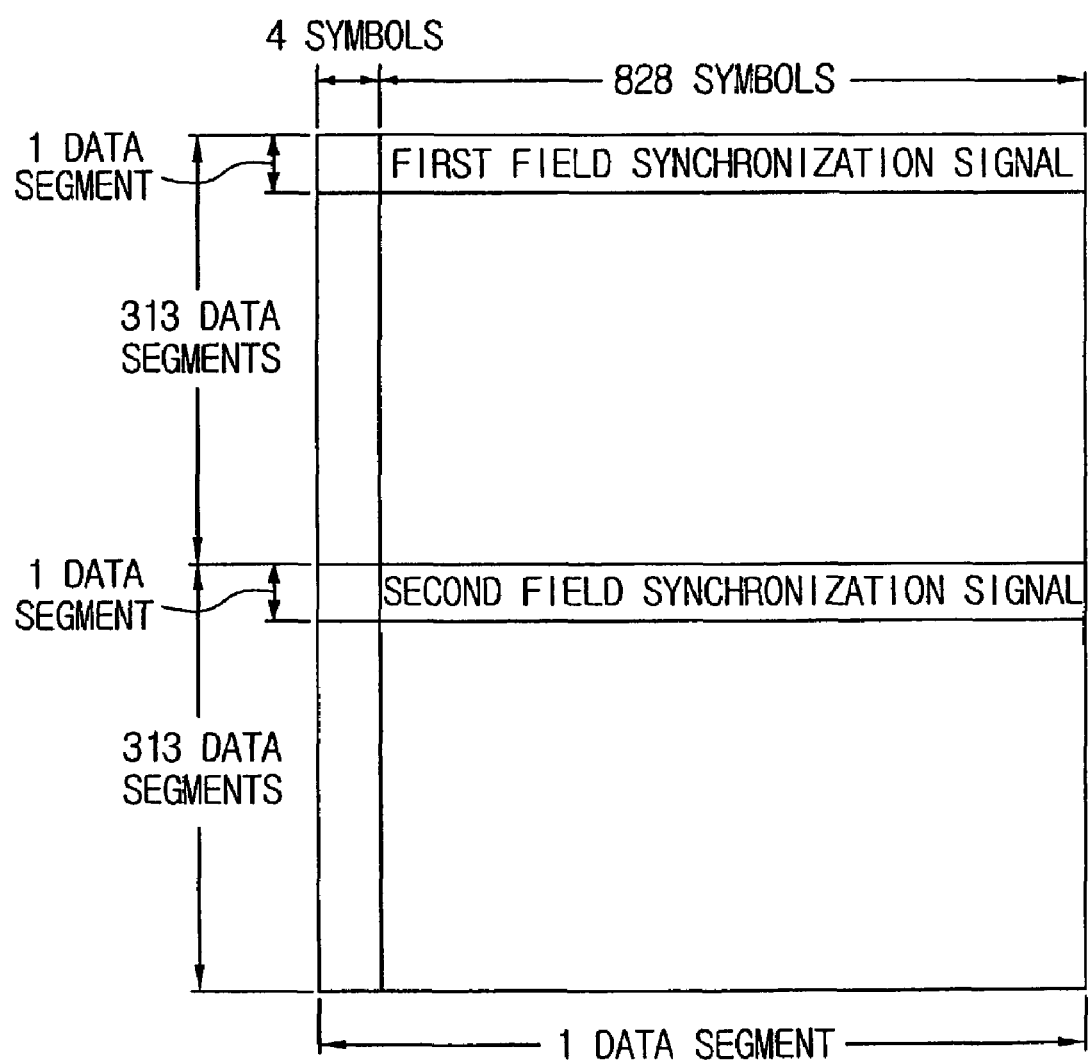
FIG. 3 is a view showing a format example of a digital broadcasting signal.

FIG. 3 is a view showing an example of a format of the digital broadcasting signal. The digital broadcasting signal receiver sends synchronizing signals to the broadcasting signals at a predetermined interval before transmitting the broadcasting signals, in order to easily perform the recovery of the broadcasting signals at the receiving terminal. The synchronizing signals are generally divided into two types. One type is a horizontal synchronizing signal that is a data segment synchronizing signal and the other type is a vertical synchronizing signal that is a field synchronizing signal. Referring to FIG. 3, the data segment synchronizing signal includes the horizontal synchronizing signal of 4 symbols and data of 828 symbols, and one frame includes 313 data segments. The 313 data segment includes one field synchronizing segment and 312 general data segments including a training sequence signal. The field synchronizing signal is placed at a first segment of each frame, and includes information in relation to the data included in a corresponding frame.

Figure 4:
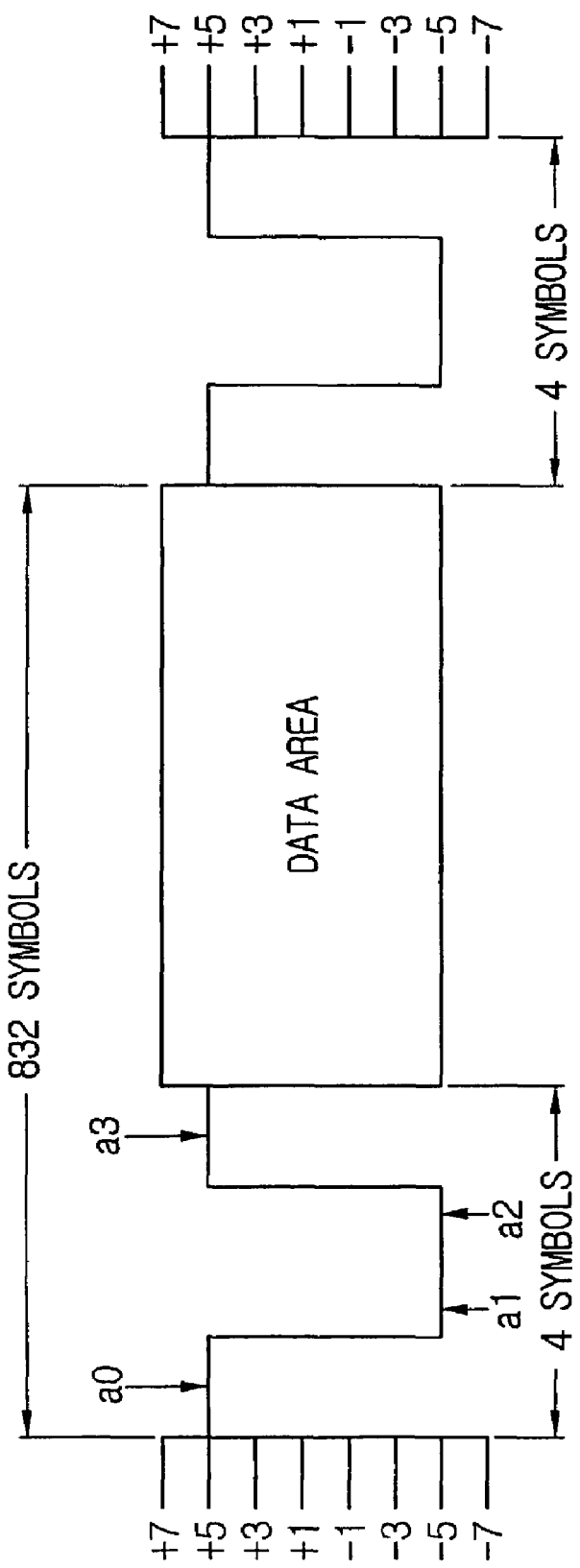
FIG. 4 is a view showing a format of a segment synchronizing signal in relation to the broadcasting signal of an VSB method.

FIG. 4 is a view showing an output format of the segment synchronizing signal in relation to the broadcasting signal of the VSB method among the broadcasting signals of the VSB method. The segment synchronizing signal is repeated every 832 symbols and includes four symbols $a_0$, $a_1$, $a_2$, and $a_3$ for each symbol. The segment synchronizing signal has the same level value for $a_0$, and $a_3$, and another same level value for $a_1$ and $a_2$. The level values of four symbols $a_0$, $a_1$, $a_2$, and $a_3$ of the segment synchronization, according to an embodiment of the present invention, have a constant pattern such as +5, −5, −5 and +5. The phase error compensation unit 50 of an embodiment of the present invention can detect and compensate the phase error in relation to the broadcasting signals by obtaining a difference value of the symbol $a_1$ and $a_2$, placed between the symbol $a_0$ and $a_3$.

Figure 5:
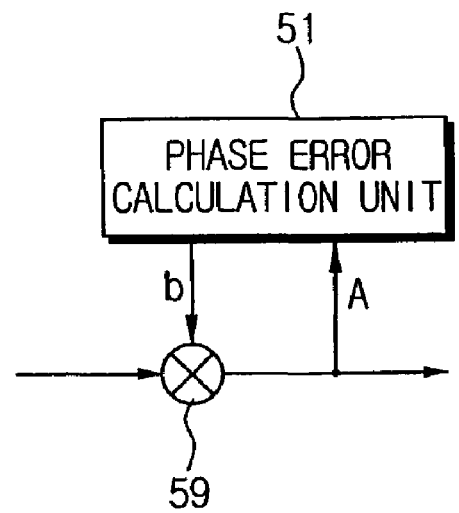
FIG. 5 is a detailed view showing a phase error recovery unit of FIG. 2.

FIG. 5 is a block diagram showing the phase error compensation unit 50 of FIG. 2 in detail. The phase error compensation unit 50 has a phase error calculation unit 51 and a multiplier 59. The phase error calculation unit 51 calculates a phase error value in relation to the broadcasting signal by subtracting segment synchronization values of the symbols $a_1$ and $a_2$ from the segment synchronization signals of the four symbols generated once every 832 symbols from the broadcasting signal output from the MF 43. The multiplier 59 compensates the phase error in relation to the broadcasting signal by multiplying the phase error value calculated at the phase error calculation unit 51 with the broadcasting signal output from the MF 43. The calculation of the multiplier 59 is a complex multiplication as the operation to compensate for the phase is performed.

Figure 6:
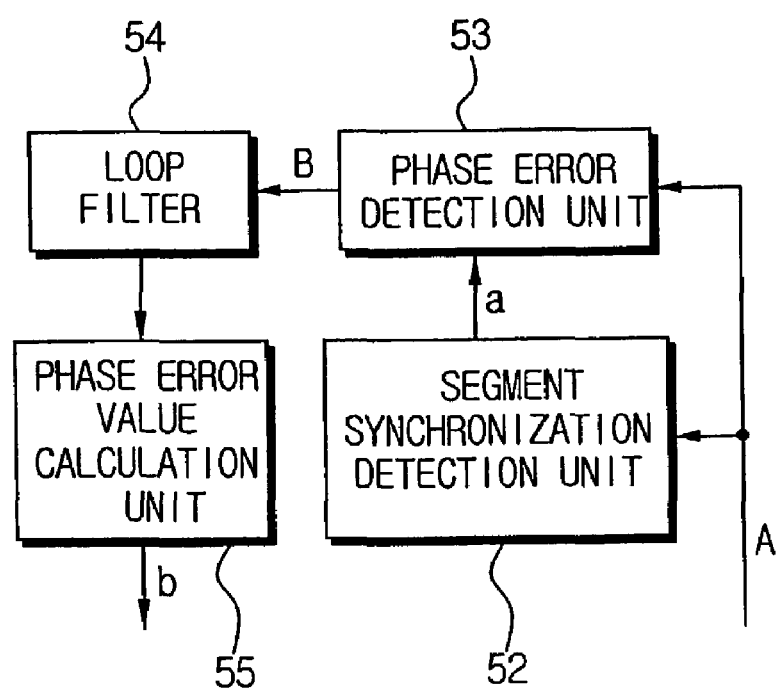
FIG. 6 is a detailed view showing a phase error calculation unit of FIG. 5.

FIG. 6 is a block diagram showing the phase error calculation unit 51 of FIG. 5 in detail. The phase error calculation unit 51 has a segment synchronization detection unit 52, a phase error detection unit 53, a loop filter 54, and a phase error value calculation unit 55.

The segment synchronization detection unit 52 detects the segment synchronization value $a_0$, $a_1$, $a_2$, and $a_3$ for each symbol of the broadcasting signal defined by the VSB method. The phase error detection unit 53 detects a phase error value for the segment synchronization value of the symbols $a_1$ and $a_2$ of the segment synchronization detected at the segment synchronization detection unit 52. The loop filter 54 calculates a phase angle corresponding to the phase error value by forming the frequency of the broadcasting signal as a fan shaped line corresponding to the phase error value calculated at the phase error detection unit 53. The phase error value calculation unit 55 calculates a trigonometrical function value corresponding to the phase angle calculated at the loop filter 54.

The broadcasting signal receiver of the present invention may include a look up table (not shown) to store the trigonometrical function value corresponding to the phase angle. Accordingly, the phase error value calculation unit 55 detects the trigonometrical function value, which corresponds to the phase angle input from the loop filter 54, from the look up table. At this time, the trigonometrical function value calculated at the phase error value calculation unit 55 is the phase error value generated at the broadcasting signal due to a mutual interference in relation to the broadcasting signal transmitted through the multi-path channel. Thus, the multiplier 59 compensates the phase error of the broadcasting signal by complex multiplying the broadcasting signal by the phase error value calculated at the phase error value calculation unit 55.

Figure 7:
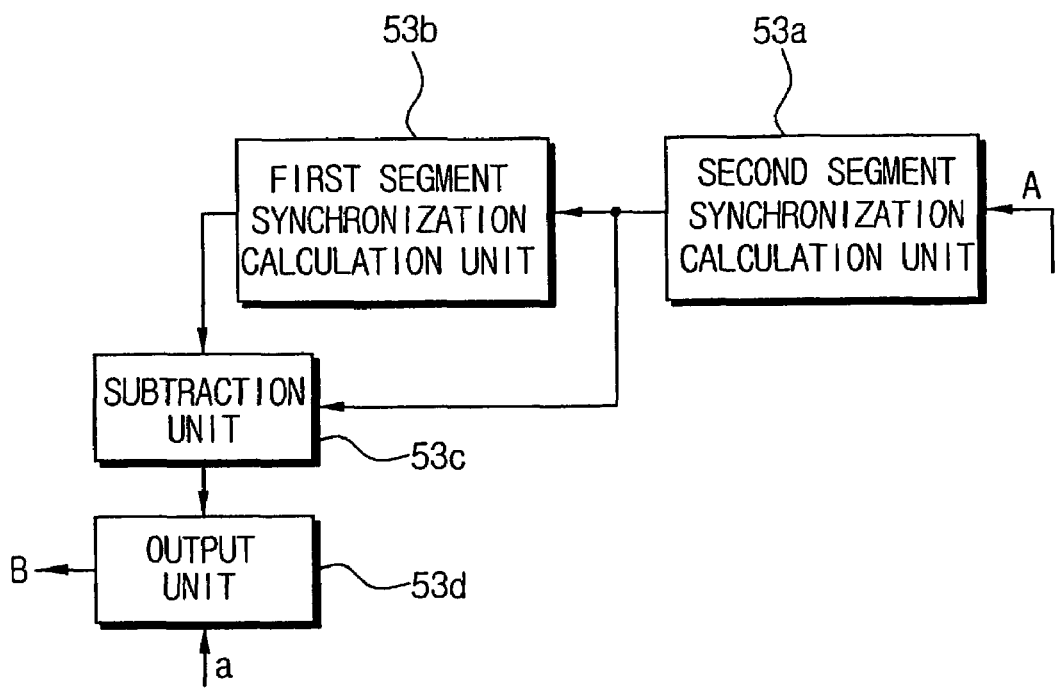
FIG. 7 is a detailed view showing a phase error detection unit of FIG. 6.

FIG. 7 is a block diagram showing the phase error detection unit of FIG. 6 in great detail. The phase error detection unit 53 has a first segment synchronization calculation unit 53a, a second synchronization calculation unit 53b, a subtraction unit 53c, and an output unit 53d. The first segment synchronization calculation unit 53a calculates a segment synchronization value ($d_1$) of the symbol $a_1$ among the four segment symbols. The second segment synchronization calculation unit 53b calculates a segment synchronization value ($d_2$) of the symbol $a_2$ among the four segment symbols. The subtraction unit 53c calculates a subtraction value (B) of the segment synchronization value ($d_1$) of the symbol $a_1$ and the segment synchronization value ($d_2$) of the symbol $a_2$.

Figure 8:
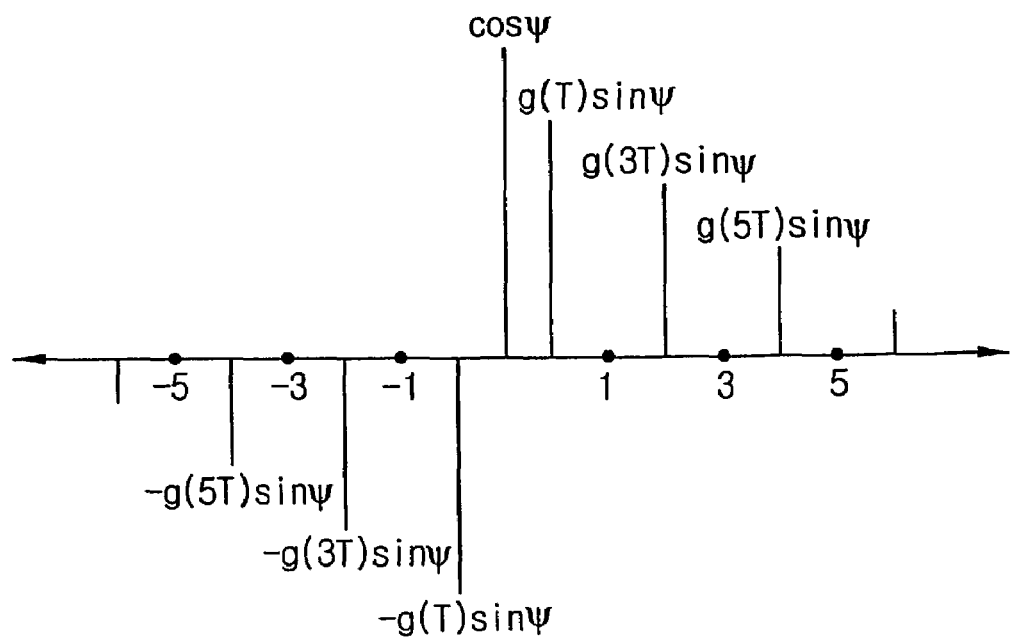
FIG. 8 is a graph showing an equivalent response of a same-phase channel when a phase error occurs.

FIG. 8 is a graph showing a channel equivalent response in relation to the broadcasting signal transmitted through the main path when the phase of the main path is shifted for 'Ψ' in a case that g(x) is a shaping filter of a waveform modulated by the VSB modulation method expressed with an offset-QAM method. A variable 'x' is −5, −3, −1, 0, 1, 3, and 5.

In the meantime, the value (V(n)) of the VSB broadcasting signal corresponding to the channel equivalent response shown in FIG. 8 in relation to the broadcasting signal output from the MF 43 can be expressed as the following mathematical expression 3:

$$V(n) = a_n \cos \Psi + (a_{n-1} - a_{n+1})g(T) + (-a_{n-3} + a_{n+3})g(3T) + (a_{n-5} a_{n+5})g(5T) + \ldots \sin \Psi$$

wherein $a_n$ is a transmission symbol of the broadcasting signal, and a pulse shaping filter is an SRC (square-root raised cosine filter) having a roll-off factor of 0.1152.

On the other hand, each segment synchronization value that can be calculated from the first segment synchronization calculation unit 53a and the second synchronization calculation unit 53b by the mathematical expression 3 can be calculated through the following expressions:

$$d_0 = a_0 \cos \Psi + (a_{-1} - a_1)g(T) + (-a_{-3} + a_3)g(3T)\sin \Psi + \ldots \qquad \text{Mathematical Expression 4}$$

$$d_1 = a_1 \cos \Psi + (a_0 - a_2)g(T) + (-a_{-2} + a_4)g(3T)\sin \Psi + \qquad \text{Mathematical Expression 5}$$

$$d_2 = a_2 \cos \Psi + (a_1 - a_3)g(T) + (-a_{-1} + a_5)g(3T)\sin \Psi + \qquad \text{Mathematical Expression 6}$$

$$d_3 = a_3 \cos \Psi + (a_2 - a_4)g(T) + (-a_0 + a_6)g(3T)\sin \Psi + \qquad \text{Mathematical Expression 7}$$

wherein the subtraction unit 53c calculates a subtraction value (B) after subtracting the mathematical expression 5 6 from the mathematical expression 6. The operation of the subtraction 53c is shown in the following mathematical expression 8.

$$B = d_1 - d_2 = 4\alpha g(T)\sin \Psi + \ldots$$

wherein $a_0 = a_3 = +\alpha$, and $a_1 = a_2 = -\alpha$.

Furthermore, 'a' is '5' and '−a' is '−5' in an embodiment of the present invention. Moreover, in an embodiment according to the present invention, only four symbols $a_0$, $a_1$, $a_2$, and $a_3$ corresponding to the segment synchronization are acknowledged as effective values, and the filter modulus (g(x)) multiplied to $a_4$ and $a_5$ is ignored as the filter modulus (g(x)) multiplied to $a_4$ and $a_5$ is a relatively lesser value compared to the filter modulus (g(x)) multiplied to the symbols $a_0$, $a_1$, $a_2$, and $a_3$.

According to the above mathematical expression 8, it is known that the phase, of which a difference between two symbols $a_1$ and $a_2$ is distorted in relation to the broadcasting signal, can be calculated through a sine function. Therefore, when the phase angle is between −90° and +90°, a sine function value is approximately a linear relation. The operation load of the equalizer 45 can be reduced as a phase offset due to the broadcasting signal transmitted through the multi-path channel detected and compensated in relation to a carrier/timing recovered broadcasting signal.

Figure 9:
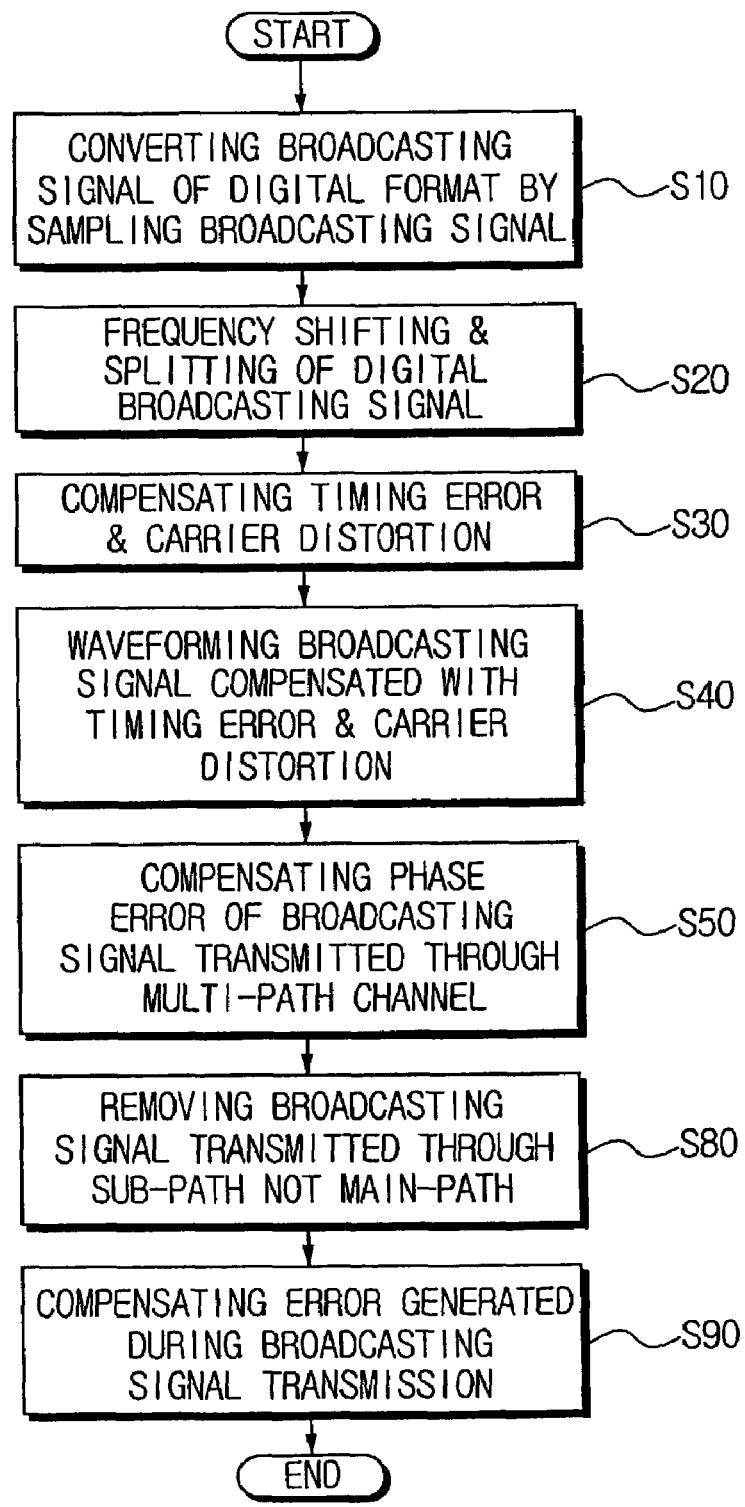
FIG. 9 is a flow chart showing an error recovery method of the broadcasting signal compensating the phase error generated when recovering a broadcasting signal transmitted through a multi-path channel.

FIG. 9 is a flow chart showing an error recovery method of the broadcasting signal to compensate the phase error generated when recovering the broadcasting signal transmitted through the multi-path channel. At operation S10 the ADC 31 converts the transmitted broadcasting signal having the analog format into the broadcasting signal having the digital format by sampling the broadcasting signal. At operation S20, the splitter 33 frequency shifts the broadcasting signal of the digital format to the baseband, and splits the broadcasting signal into an I channel signal and a Q channel signal. At operation S30, the timing error detection unit 37 and the timing recovery unit 35 detect and compensate the timing error generated when the sampling operation of ADC 31 is operated in relation to the broadcasting signal that is split to an I/Q channel signal. In addition, the DFPLL 41 compensates the carrier frequency distortion and the phase distortion of the broadcasting signal, which can be generated during the sampling operation of ADC 31 through the timing clock information output from the timing recovery unit 35.

In addition, at operation S40, the MF 43 waveforms the broadcasting signal that is compensated with the timing error, the carrier distortion, and the phase distortion. At this time, the MF 43 operates in a way that the ratio of S/N in relation to the broadcasting signal is at a maximum. At operation S50, the phase error compensation unit 50 compensates the phase error generated through the mutual interference among the broadcasting signals transmitted through the multi-path channel. At operation S80, the equalizer 45 removes the broadcasting signal transmitted through the sub path except the broadcast signal transmitted through the main path in relation to the broadcasting signal that has compensated the phase error through the multi-path channel. On the other hand, at operation S90, the FEC 47 compensates the phase error during the transmission in relation to the broadcasting signal transmitted through the main path.

Figure 10:
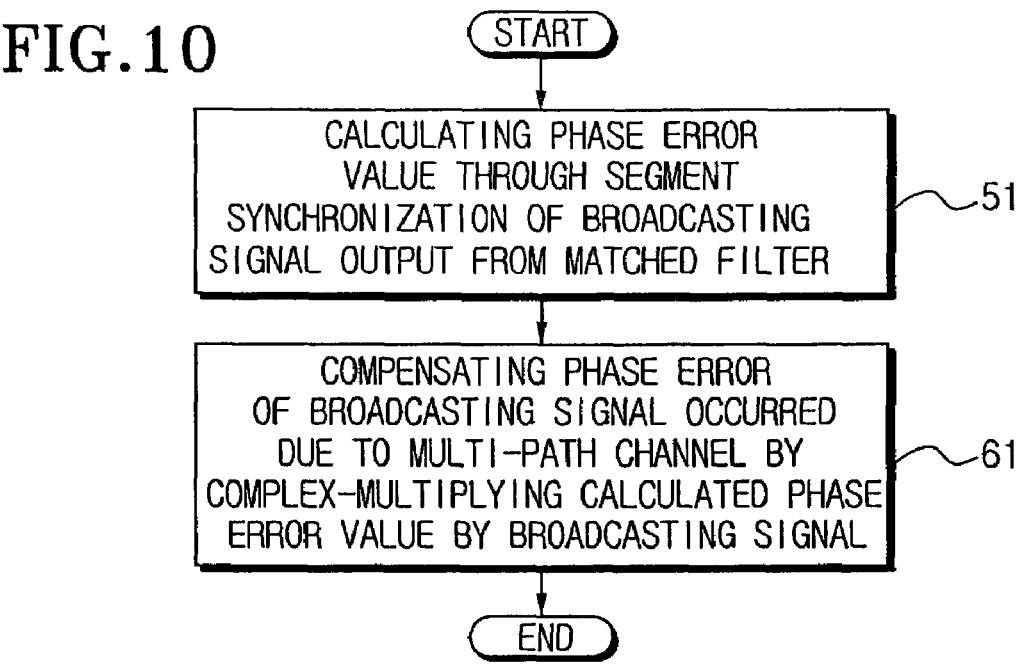
FIG. 10 is a detailed flow chart showing a compensation of the phase error according to a mutual interference of the broadcasting signal transmitted through the multi-path channel of FIG. 9.

FIG. 10 is a flow chart showing the operation S50 of compensating the phase error according to the mutual interference of the broadcasting signal transmitted through the multi-path channel of FIG. 9. Referring to FIG. 10, at operation S51, the phase error calculation unit 51 calculates the phase error value according to a mutual interference in relation to the broadcasting signal transmitted through the multi-path channel by detecting the segment synchronization $a_0$, $a_1$, $a_2$, and $a_3$ of the broadcasting signal in relation to the broadcasting signal output from the MF 43. Further, at operation S61, the multiplier 59 complex multiplies the phase error value calculated by the phase error calculation unit 51 and the broadcasting signal. Accordingly, the phase error caused by the mutual interference of the broadcasting signal transmitted through the multi-path channel can be compensated.

Accordingly, the phase error caused by the mutual interference of the broadcasting signal transmitted through the multi-path channel can be compensated.

Figure 11:
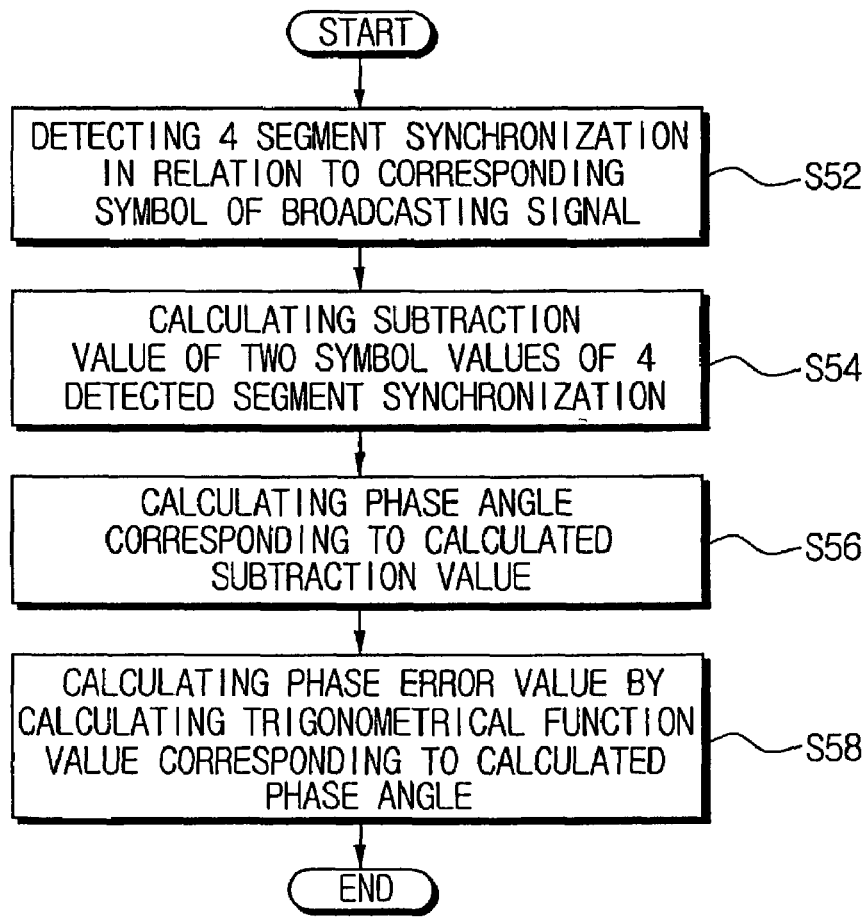
FIG. 11 is a detailed flow chart showing a calculation of the phase error value of FIG. 10.

FIG. 11 is a flow chart showing the operation S51 of calculating the phase error value in detail. At operation S52, the segment synchronization detection unit 52 detects a four-segment synchronization in relation to a corresponding symbol of the broadcasting signal. At operation S54, the phase error detection unit 53 calculates the subtraction value (B) in relation to two symbols by subtracting two symbol values among the detected one for segment synchronization. At operation S56, the loop filter 54 calculates the phase angle through the linear feature of the calculated subtraction value (B). At operation S58, the phase error value calculation unit 55 calculates the phase error value by calculating the trigonometrical function value corresponding to the calculated phase angle.

Figure 12:
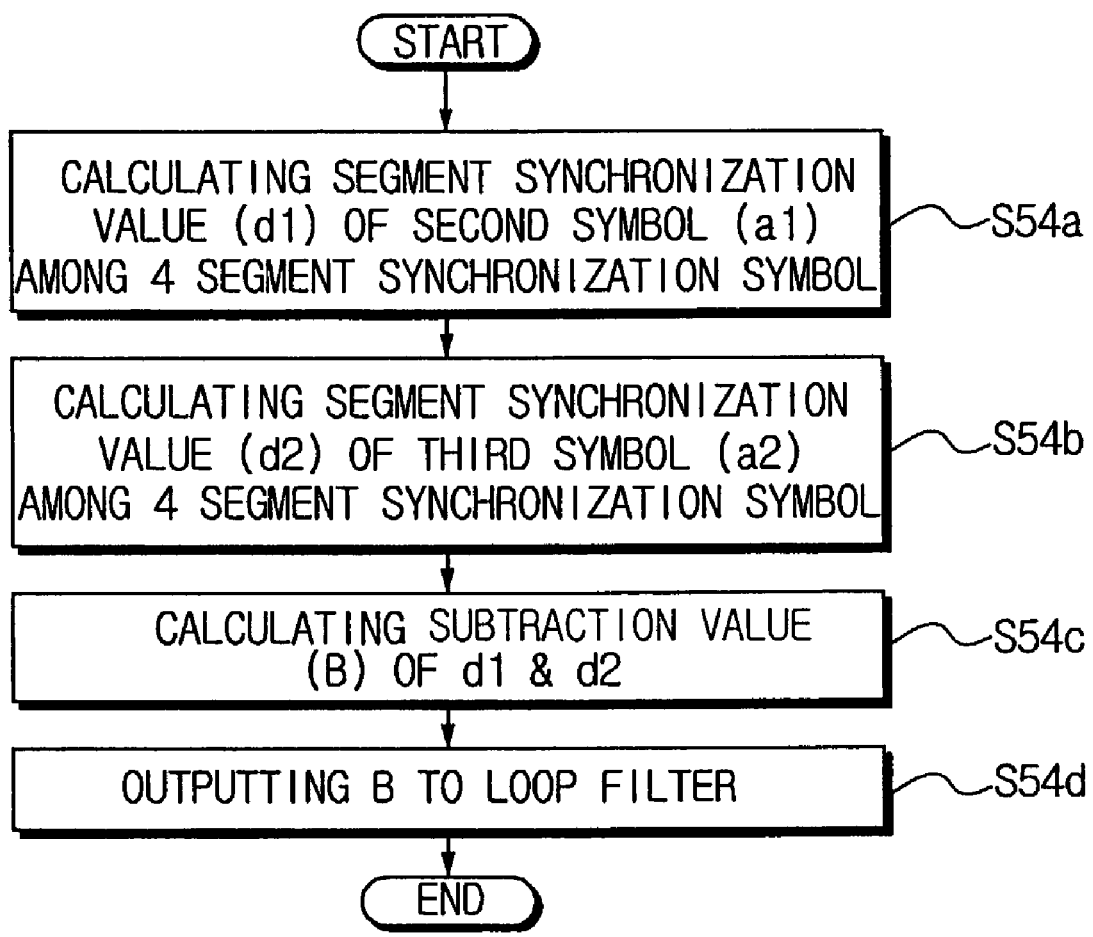
FIG. 12 is a detailed block diagram showing a calculation of a subtraction value of FIG. 11.

FIG. 12 is a block diagram showing the operation S54 of calculating the subtraction value (B) of FIG. 11 in detail. At operation S54a, the first segment synchronization calculation unit 53a calculates the segment synchronization value ($d_1$) of the second symbol ($a_1$) among the four-segment synchronization symbols. At operation S54b, the second segment synchronization calculation unit 53b calculates the segment synchronization value ($d_2$) of the third symbol ($a_2$) among the four-segment synchronization symbols. At operation S54c, the subtraction unit 53c calculates the subtraction value (B) of the segment synchronization value ($d_1$) of the second symbol ($a_1$) and the segment synchronization value ($d_2$) of the third symbol ($a_2$). At operation S54de, the output unit 53d outputs the subtraction value (B) to the loop filter 54. Therefore, the phase error caused by the mutual interference of the broadcasting signal transmitted through the multi-path channel can be compensated.

According to the present invention, a phase offset caused by a broadcasting signal transmitted through a multi-path channel is removed after recovering a carrier/timing in relation to the broadcasting signal, thus a load operation of an equalizer is reduced and, accordingly, an efficiency of the equalizer is improved. Moreover, an efficiency of an entire digital broadcasting receiver is also improved.

Furthermore, the phase error in relation to the broadcasting signal is compensated before a display of the broadcasting signal at a rear end of an FEC; thus, the digital broadcasting signal receiver can reproduce an image clearer than displaying through a display operation in relation to the broadcasting signal. described preferred embodiment, but various changes and modifications can be made within the spirit and the scope of the present invention. Accordingly, the scope of the present invention is not limited within the described range but the following claims.

What is claimed is:

1. An error recovery apparatus of a digital broadcasting receiver, comprising:
   an analog-to-digital converting (ADC) unit to convert a broadcasting signal of an analog format into a digital format through sampling;
   a splitter to shift the broadcasting signal of the digital format to a baseband, and to split the broadcasting signal to an in-phase channel signal and a quadrature channel signal;
   a sampling distortion compensation unit to compensate an error generated in the broadcasting signal due to the sampling of the ADC unit;
   a phase error compensation unit to compensate a phase error caused by interference of the broadcasting signal when the broadcasting signal is transmitted through a multi-path channel; and
   an equalizer to remove the broadcasting signal which is not transmitted through a main path of the multi-path channel,
   wherein the phase error calculation unit calculates the phase error of the broadcasting signal based on a difference of two median symbols of the four symbols of the segment synchronization signal.

2. An error recovery apparatus of a digital broadcasting receiver, comprising:
   an analog-to-digital converting (ADC) unit to convert a broadcasting signal of an analog format into a digital format through sampling;
   a splitter to shift the broadcasting signal of the digital format to a baseband, and to split the broadcasting signal to an in-phase channel signal and a quadrature channel signal;
   a sampling distortion compensation unit to compensate an error generated in the broadcasting signal due to the sampling of the ADC unit;
   a phase error compensation unit to compensate a phase error caused by interference of the broadcasting signal when the broadcasting signal is transmitted through a multi-path channel; and
   an equalizer to remove the broadcasting signal which is not transmitted through a main path of the multi-path channel,
   wherein the phase error calculation unit comprises:
   a segment synchronization detection unit to detect the segment synchronization signal having the four symbols;
   a phase error detection unit to calculate a difference value of two middle symbols among the four symbols;
   a loop filter to calculate a phase angle corresponding to the phase error through a linear feature of the broadcasting signal corresponding to the difference value of the two middle symbols; and
   a phase error value calculation unit to calculate the phase error value by calculating a trigonometrical function value corresponding to the phase angle.

3. The error recovery apparatus of claim 2, wherein phase error detection unit comprises:
   a first segment synchronization calculation unit to calculate a first synchronization value that is a segment synchronization value of a second symbol among the four symbols;
   a second segment synchronization calculation unit to calculate a second synchronization value that is the segment synchronization value of a third symbol among the four symbols;
   a subtraction unit to calculate a difference of a phase of the second symbol and a phase of the third symbol; and
   an output unit to output the difference to the loop filter.

4. A method of compensating a broadcasting signal error of a digital broadcasting receiver comprising:
   converting the broadcasting signal of an analog format into a digital format by sampling the broadcasting signal;
   shifting the broadcasting signal of the digital format to a baseband and splitting the broadcasting signal to an in-phase channel signal or a quadrature channel signal;
   compensating an error generated in the broadcasting signal due to the sampling of the broadcast signal;
   compensating a phase error caused by mutual interference of the transmitted broadcasting signal when the broadcasting signal is transmitted through a multi-path channel;
   removing the broadcasting signal transmitted through a transmission path except a main path through which the broadcasting signal is transmitted,
   wherein the compensation of the error generated in the broadcasting signal comprises:
   compensating a timing error generated in the broadcasting signal when the sampling is performed, and
   compensating a carrier distortion and the phase error generated in the broadcasting signal when the sampling is performed, and
   wherein the compensation of the error generated in the broadcasting signal comprises detecting a timing error value of the broadcasting signal generated when the sampling is performed, where the timing error of the broadcasting signal is compensated based on the detected timing error value;

calculating a ratio of signal to noise of the broadcasting signal, where the timing error value, the carrier distortion, and the phase error are compensated before compensating the phase error; and recovering a data error of the broadcasting signal generated on the transmission path of the broadcasting signal from a sending terminal, after the removing of the broadcasting signal transmitted through the transmission path except the main path, wherein the compensation of the phase error comprises:
calculating the phase error value caused by the mutual interference of the broadcasting signal transmitted through the multi-path channel from a segment synchronization signal which is a synchronization signal of each data of the broadcasting signal, and compensating the phase error by complex multiplying the phase error value and the broadcasting signal, wherein the broadcasting signal has 832 symbol per data, and the segment synchronization signal is generated every 832 symbols, and the segment synchronization signal comprises four symbols, and wherein the phase error value is calculated through a difference value in relation to two symbols among the segment synchronization signals in the compensation of the phase error.

5. The method of claim 4, wherein the compensation of the phase error comprises:

detecting the segment synchronization signal of the four symbols from the broadcasting signal, calculating a difference value of a synchronization value of two middle symbols among the four symbols, calculating a phase angle corresponding to the phase error through a linear feature of the broadcasting signal corresponding to the difference value, and calculating the phase error value by calculating a trigonometrical function value corresponding to the phase angle.

6. The method of claim 5, wherein the calculation of the difference value of the synchronization value of the two middle symbols comprises:

calculating a first synchronization value that is a segment synchronization value of a second symbol among the four symbols, calculating a second synchronization value that is the segment synchronization value of third symbol among the four symbols, and calculating a difference of a phase of the second symbol and a phase of the third symbol by subtracting the first synchronization value from the second synchronization value and outputting a signal indicative thereof.

7. An error recovery apparatus of a digital broadcasting receiver to compensate a phase error generated when recovering a broadcasting signal transmitted through a multi-path channel, comprising:

an analog-to-digital converter digitally sampling the broadcasting signal and converting broadcasting signal of an analog format into a digital format;

a sampling distortion compensation unit compensating an error generated in the broadcasting signal due to the digitally sampling of the broadcasting signal;

a digital frequency phase locked loop recovering the phase of the broadcasting signal and compensating a distortion of a carrier signal of the broadcasting signal by tracing position information of a pilot signal that is inserted at a time the broadcasting signal is transmitted;

a phase error compensation unit removing a phase offset caused by an interference in the broadcasting signal transmitted through the multi-path channel after recovering and compensating the distortion of the carrier signal in relation to the broadcasting signal; and a forward error correction unit detecting and compensating data error generated during the transmission in relation to the broadcasting signal output from the phase error compensation unit.

8. The error recovery apparatus of claim 7, wherein the phase error compensation unit comprises:

a phase error calculation unit calculating a phase error value in relation to the broadcasting signal by subtracting segment synchronization values of symbols $a_1$ and $a_2$ from segment synchronization signals of four symbols generated once every 832 symbols from the broadcasting signal from the matched filter; and a multiplier compensating the phase error in relation to the broadcasting signal by multiplying the phase error value calculated at the phase error calculation unit with the broadcasting signal output from the matched filter.

9. The error recovery apparatus of claim 8, wherein the phase error calculation unit comprises:

a segment synchronization detection unit detecting the segment synchronization values $a_0$, $a_1$, $a_2$, and $a_3$ for each symbol of the broadcasting signal, a phase error detection unit detecting a phase error value for the segment synchronization values of the symbols $a_1$ and $a_2$ of the segment synchronization detected at the segment synchronization detection unit, and a loop filter calculating a phase angle corresponding to the phase error value by forming a frequency of the broadcasting signal as a fan shaped line corresponding to the phase error value calculated at the phase error detection unit.

10. The error recovery apparatus of claim 9, the phase error calculation unit comprises:

a first segment synchronization calculation unit calculating a segment synchronization value ($d_1$) of the symbol $a_1$ among the four segment symbols, a second segment synchronization calculation unit calculating a segment synchronization value ($d_2$) of the symbol $a_2$ among the four segment symbols, and a subtraction unit calculating a subtraction value (B) of the segment synchronization value ($d_1$) of the symbol $a_1$ and the segment synchronization value ($d_2$) of the symbol $a_2$.

11. The error recovery apparatus of claim 7, further comprising:

a timing recovery unit recovering the timing error of a corresponding symbol and outputting clock information of the recovered timing error to the digital frequency phase locked loop.

12. The error recovery apparatus of claim 11, wherein the phase of the broadcasting signal is a frequency offset in relation to the broadcasting signal through the clock information output from the timing recovery unit.

13. The error recovery apparatus of claim 7, further comprising:

a matched filter waveforming the digital broadcasting signal so that a signal per noise (S/N) rate of the broadcasting signal is maximized.

14. The error recovery apparatus of claim 13, wherein the matched filter comprises an SRC (square-root raised cosine) filter having a roll-off of 0.1152.

* * * * *

UNITED STATES PATENT AND TRADEMARK OFFICE
CERTIFICATE OF CORRECTION

PATENT NO. : 7,206,358 B2  
APPLICATION NO. : 10/279876  
DATED : April 17, 2007  
INVENTOR(S) : Joon-soo Kim Page 1 of 1

It is certified that error appears in the above-identified patent and that said Letters Patent is hereby corrected as shown below:

Column 13, Line 20, change "symbol" to --symbols--.

Column 14, Line 36, after "9," insert --wherein--.

Signed and Sealed this

Seventh Day of August, 2007

JON W. DUDAS  
*Director of the United States Patent and Trademark Office*